(No Model.) 2 Sheets—Sheet 2.

E. BAZIN.
ELECTRIC BATTERY.

No. 349,380. Patented Sept. 21, 1886.

Witnesses
Alphons Blétry
Constant Blétry

Inventor:
Ernest Bazin
Briesen & Steele attorneys.

UNITED STATES PATENT OFFICE.

ERNEST BAZIN, OF PARIS, FRANCE.

ELECTRIC BATTERY.

SPECIFICATION forming part of Letters Patent No. 349,380, dated September 21, 1886.

Application filed April 6, 1886. Serial No. 197,928. (No model.) Patented in France October 13, 1885, No. 171,643.

*To all whom it may concern:*

Be it known that I, ERNEST BAZIN, civil engineer, and chevalier of the Legion of Honour, a citizen of France, residing at Paris, in the French Republic, have invented a new and useful Improvement in Electric Batteries with Fixed Zincs and Rotating Carbons, of which the following is a specification, and for which I have obtained Letters Patent in France, No. 171,643, dated October 13, 1885.

This invention consists in a battery having the zinc or positive electrodes stationary, and causing the negative or carbon disks only to revolve in the exciting-liquid, which, in this case, is or may be bichromate of potash or soda. This arrangement, which is necessary for the proper and efficient working of the battery, also facilitates the renewal of the zincs, when so required, and also admits of gradually and progressively immersing them in the liquid in the same progressive manner as the carbons. These zincs are in the form of segments of circles, each electrode consisting of two segments, each one of which is mounted by bolting or otherwise attaching it to the prongs of a two-pronged fork, thus leaving a space or opening between each, giving free passage of the current to the carbons. The shafts of these forks pass through openings made in a bar crossing above the head of the frame and mounted in supports fixed to its bed, so that these elements hang from this bar, which is provided at each end with handles by which the whole series of zincs can be lifted, lowered, or completely removed from the liquid, for arresting the action of the battery, or for renewing the zincs when so required. The two sides of the zincs formed by the two segments of a circle are near the two sides of the porous cell into which they plunge. The axis on which the carbons are mounted passes between the spaces formed between these two parts of the zincs. By this method the zincs and carbons being in close proximity internal resistance is lowered.

Figure 1:
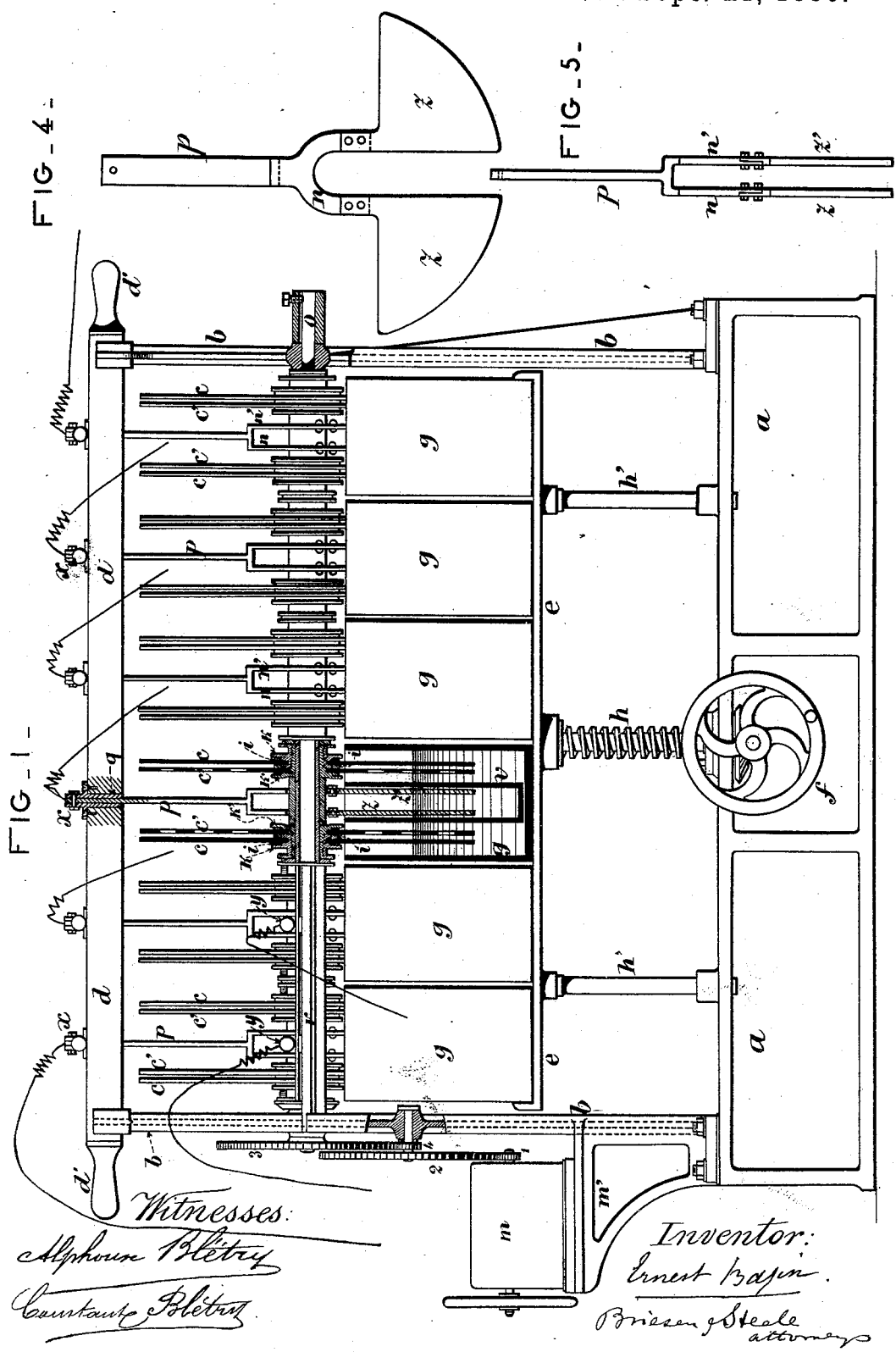
Figure 2:
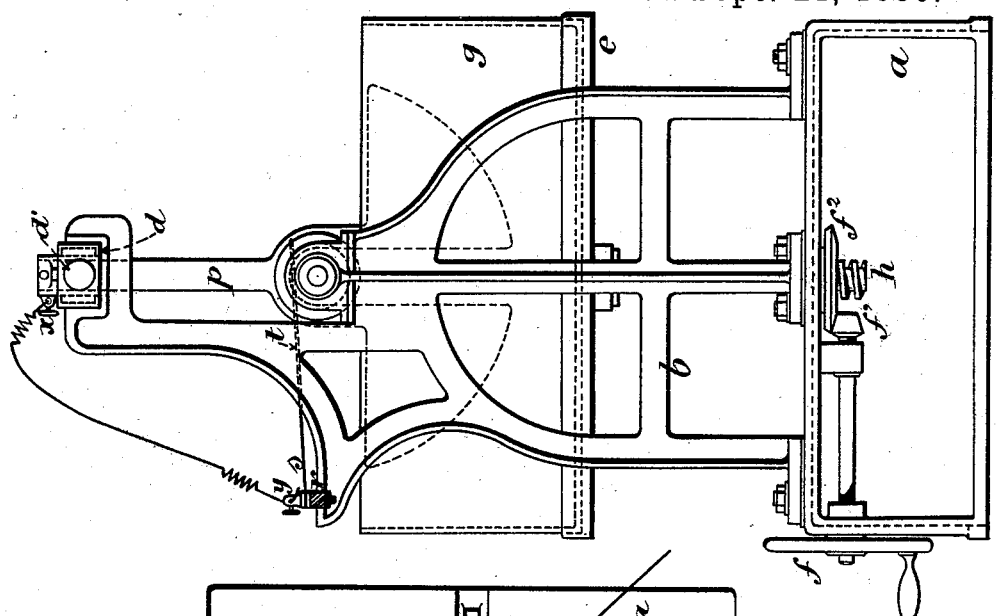
Figure 3:
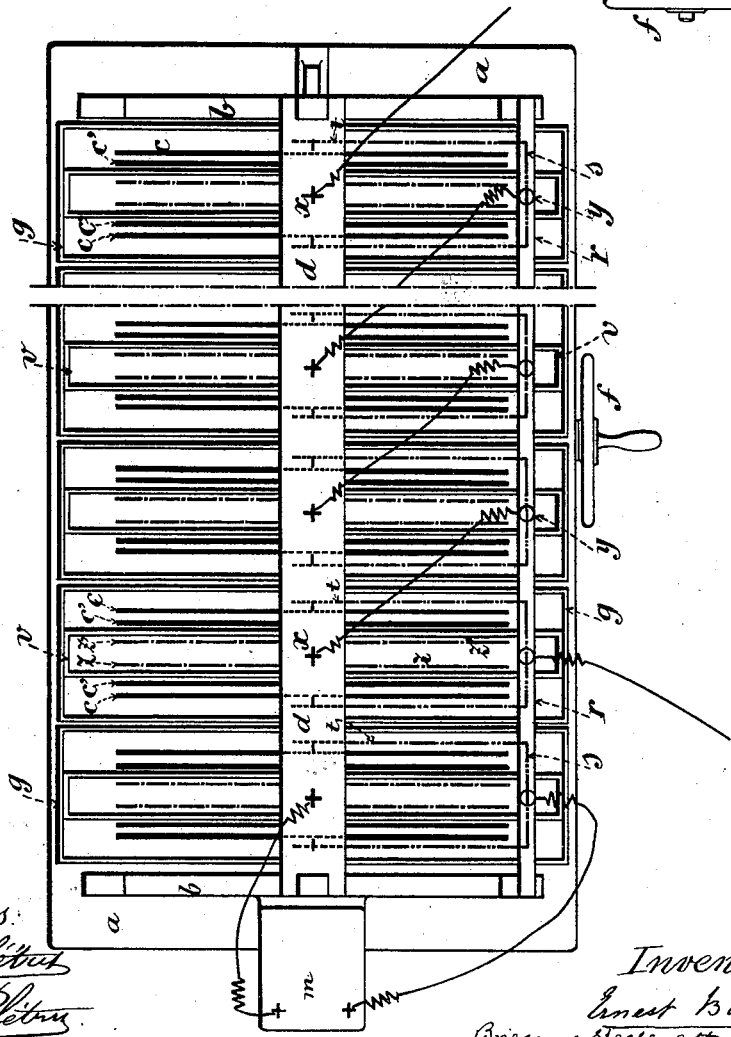

Figure 1 of the accompanying drawings is a side elevation of a battery embodying my invention, seen partly in section, for showing certain parts essential to the system. Fig. 2 is a corresponding side view; Fig. 3, a plan showing the method of coupling the elements. Figs. 4 and 5 are a front and side view of the half-zincs, in the form of segments of circles, which are all fixed and stationary, as already mentioned.

On a frame, $a$, of a special form and dimensions, the two cast-iron sides $b\,b'$ rise and are bolted, for supporting the axis of the shaft $o$ of the carbons. At their summits they receive a cross-bar, $d$, of mahogany or other wood, to which are suspended the zincs, as described. This cross-bar $d$ is terminated by handles $d'$, which admit of its removal, or of putting it into position. A perforated plate, $e$, which bears the troughs of all the elements, is raised and lowered between the sides $b\,b'$ of the frame by aid of a fly-wheel, $f$, governing, by bevel-wheels $f'\,f^2$, an endless screw, $h$, fixed to and supporting the table $e$. Columns $h'\,h'$, sliding in the base of the frame, guide the movements of the table and insure its perfectly level movement. One of the ends of the frame $b$ is cast with the bracket $m'$, supporting the electric motor $m$. In this manner several may be placed side by side and connected in the most suitable and practical manner. The electric motor $m$ receives the current from one of the elements of the battery for communicating motion by a series of wheels, 1 2 3 4, to the shaft $o$ of the carbons. This shaft $o$ receives on insulated parts the brass jaws of sockets, $k\,k'$, which are screwed together for firmly holding two carbon disks, $c\,c'$. Each of the elements is formed of a zinc, constructed as described, (*vide* Figs. 2, 4, 5,) and four carbons arranged two on each side of the zinc electrode and coupled, as will be hereinafter mentioned. The outside carbons, $c$, are plain disks; but the inner ones, $c'$, are perforated with holes or openings sufficiently large not to diminish or check the passage of the electric current. India-rubber rings $i$, locked between the jaws of the sockets $k\,k'$ and the carbons, form tight joints. The segments of circles forming the zinc electrodes are bolted or otherwise attached to prongs $n\,n'$ of a fork, the shaft $p$ of which passes through an opening, $q$, in the insulated cross-bar $d$, where it is solidly fixed by bolting or any other appropriate method. The parts $z\,z'$ of the zincs are placed transversely across the shaft $o$—that is, this shaft passes between them without touching them, so as not to interfere with its rotation. They are close to the sides or walls of the porous cells $v$, into which the zincs plunge. These cells are placed in the troughs $g$ of the elements. The electric current passing from the carbons to the zincs through the exciting-liquid is conducted from the zincs by the terminals $x\ x$, mounted on the supports $q$ of the cross-bar $d$, the conducting-wires being connected to other terminals, $y\ y$, mounted on a bar, $r$, covered with insulating substance permanently placed in front of the axis, where the zincs and carbons are mounted. The terminals $y$ communicate with the supports $s$ of the brushes $t$, which are in contact with the carbons. The circuit is established in a simple manner without rendering the removal of the electrodes difficult or expensive. One of the zinc terminals, $x$, connects with the motor, and so does one of the carbon terminals, $y$, as shown in Fig. 3.

Action: The carbons $c\ c'$ being fixed on the shaft $o$ (common to all) and the zincs suspended from the cross-bar $d$, as already described, the plate $e$ is raised with the troughs $g$ it supports, so as to plunge the zincs and carbons in the bichromate-of-soda or potash liquid. The current is at once established. The motor $m$ is set in motion and causes the requisite rotation of the carbons for preventing polarization.

The zincs are stationary, but it should be observed that their immersion is in unison with that of the carbons, and that both are equally progressive and proportionate one with the other. If necessary, all the zincs can be removed simultaneously by seizing the handles $d'\ d'$ of the cross-bar $d$ and lifting it from its supports.

I claim as my invention and desire to secure by Letters Patent—

1. The fixed positive electrodes or zincs constructed as described—that is to say, of two segments of a circle, $z\ z'$, connected to the two prongs of a forked piece, the shaft $p$ of which is held in insulated supports in and combined with the cross-bar $d$ at the head of the frame of the apparatus, so that they hang suspended from this bar.

2. The negative or carbon electrodes constructed of two carbon disks arranged, as described, in pairs on each side of the zincs, the two outside carbons being plain while the inside pair nearest the zincs alone are perforated, substantially as described.

3. The carbons on a shaft, combined with means, substantially as described, for revolving said shaft, and with the forked segmental zincs $z\ z'$ and cross-bar $d$, said zincs straddling said shaft, substantially as herein described.

ERNEST BAZIN.

Witnesses:
ROBT. M. HOOPER,
ALPHONSE BLÉTRY.